## 3,681,168
BONDING WITH VINYL ACETATE POLYMER MODIFIED RESORCINOL-BASE ADHESIVE

Edgar Braddbury Baker, Springfield, Oreg., assignor to Borden, Inc.
No Drawing. Original application Mar. 21, 1969, Ser. No. 809,391, now Patent No. 3,600,353. Divided and this application Sept. 8, 1970, Ser. No. 70,582
Int. Cl. C09j 3/14
U.S. Cl. 156—332                    5 Claims

ABSTRACT OF THE DISCLOSURE

This invention relates to a method of gluing wood, wood articles and the like with resorcinol-based resin adhesives, said adhesives comprising a resorcinol-based resin and a vinyl acetate polymer in an amount up to about 10% of the resorcinol-based resin solids and the method comprising applying the thus modified adhesive at a total solids level corresponding to between about 80% and about 90% of the level normally required in the case of resorcinol-based resin adhesives not containing vinyl acetate polymers whereby boil-proof and weather-resistant bonds are created not substantially different from the bonds obtainable with the unmodified resorcinol-based resin under the same conditions of assembly and cure.

---

This application is a divisional application of Ser. No. 809,391 filed Mar. 21, 1969 now Patent No. 3,600,353.

BACKGROUND OF THE INVENTION

Resorcinol-based phenolic resins have found special places for themselves in the adhesive industry because they can form bonds which are durable to boiling water and to outdoor exposure, and particularly because they are capable of setting or curing without the addition of cellulose-degrading acid catalysts and at relatively low temperaturs, even at ambient temperatures. For these reasons, resorcinol-based resins are desirable, for example, in glues for laminating structural timbers and in secondary adhesives used for assembling articles such as furniture which cannot be conveniently submitted to a high-temperature curing cycle. However, a great disadvantage attached to the use of resorcinol-based resins has been their high cost compared to the straight phenolic resins.

Attempts have been made to lower the cost by simply diluting the resins with water or other solvents and applying lower amounts of solids between the adherend surfaces, but these attempts have been unsatisfactory since the viscosity of such dilutions is not sufficient for proper spreading. Lower solids resins can be made to desired spreading viscosity by adjusting the proportion of formaldehyde, but such solutions are unsatisfactory because they have excessively slow speeds of curing.

Attempts to incorporate other materials and still maintain the inherent advantages of resorcinol-based resin have been unsuccessful. Many materials had to be eliminated because they were not sufficiently compatible with resorcinol-based resins. Other materials including methyl cellulose, polyvinyl alcohol, and highly carboxylated acrylic copolymers, although compatible, give mixtures with undesirable viscosity characteristics, the viscosity either being too high from the start or changing rapidly during the period of pot life.

SUMMARY OF THE INVENTION

Novel resorcinol-based resin adhesives have now been found which maintain the level of desired properties of such adhesives, but at lower levels of resorcinol-based resin solids. A method has also been found to adhere cellulosic materials whereby the novel adhesives of the present invention are used at solids levels less than that used with resorcinol-based resin adhesives of the prior art. The net result in each case and overall is a greatly reduced cost. In short, the instant invention comprises an aqueous adhesive solution comprising a resorcinol-based resin and up to about 10% by weight, based on the resin solids, of a vinyl acetate polymer and also comprises the method of adhering cellulosic substrates including the steps of applying said adhesive solution admixed with the usual hardener to at least one adherend surface and curing the adhesive to form the substrates into a unitary assembly.

It has been surprisingly found that adhesives prepared according to this invention have substantially the same flat viscosity characteristics as the parent resorcinol-based resins and that the adhesive bonds provided by the method of this invention even when cured at temperatures between about 60° F. and about 120° F., have substantially the same strength and resistance to boiling water and weather exposure as are provided by the parent resorcinol-based resin alone even when total solids applied between adherend surfaces is reduced to about 80% of the level required in the case of the resorcinol-based resin adhesives without the vinyl acetate polymers.

DETAILED DESCRIPTION

The two main constituents of the adhesives of the instant invention are the resorcinol-based resin and the vinyl acetate polymer.

As used herein the term "resorcinol-based resin" refers to any water-soluble or water-dispersible resorcinol-phenol-formaldehyde condensate of the novolak-type comprising sufficient quantity of resorcinol to confer the desired capability of curing at low temperature and forming adhesive joints resistant to boiling and to weather. While it is possible to omit phenol entirely, it is known that up to 75% of the resorcinol on a molar basis may be replaced by phenol without losing most of the benefits of resorcinol. In general when phenol is used a mole ratio of resorcinol to phenol equal to between 40/60 and 60/40 is preferred for optimal balance of properties and cost.

With the present cost of materials, resorcinol and phenol themselves are preferred, but products with comparable properties can be made with a portion, and in some instances all of the resorcinol replaced by other polyhydroxy benzenes such as catechol, hydroquinone, pyrogallol, hydroxyquinol, 1,2,4-trihydroxy benzene, phloroglucinol, and mixtures thereof. In like manner, phenol itself can be replaced by any of the cresols, xylenols and the like and their mixtures. Limited amounts of vegetable tannins may also be included.

Methods for preparing resorcinol-based resins are well-known in the art as illustrated, for example, in U.S. Patents 2,490,927 and 3,210,309 and are not part of the instant invention. Usually, resorcinol and phenol may first be mixed and then reacted with formaldehyde. Alternatively, the resorcinol and phenol may be reacted with formaldehyde in separate stages. It is commonly accepted that similar products are obtained by means of these two methods, with end properties depending largely on the mole ratio of resorcinol to phenol and on the pH of reaction. In any event, resorcinol-based resins made by any of the prior art procedures are suitable for use in the adhesives of the present invention.

While formaldehyde is the preferred aldehyde for present economic reasons as well as technical reasons, comparable products can be made replacing all or part of said formaldehyde with other aldehydes such as acetaldehyde, paraformaldehyde, propyl aldehyde, any butyl aldehyde, furfuryl aldehyde, or mixtures thereof. The use of the term formaldehyde herein is therefore to be understood as designating this generic class of aldehydes.

Resorcinol-based resins are commonly cured by the addition of a hardener and such hardeners are equally effective with the adhesives of this invention. They include various methylene compounds such as formaldehyde itself, certain formaldehyde compounds, paraformaldehyde, alpha-polyoxymethylene. When curing is to be carried out at elevated temperatures, it is possible to use hexamethylenetetramine. The preferred hardening agent is alpha-polyoxymethylene as it assists in providing the desired curing at room temperature or above at a good rate.

The vinyl acetate polymer to be used in carrying out this invention may be selected from the group consisting of vinyl acetate homopolymers and copolymers of vinyl acetate with at least one olefinically unsaturated coreactive monomer. Said polymers may be prepared by any of the known methods of polymerizing vinyl monomers including solution, suspension and emulsion polymerization procedures. Latexes formed by emulsion polymerization are preferred because of their relative ease of incorporation into the resorcinol-based resin solution. Such latexes may be synthesized with the assistance of any of the usual surfactants and of polymeric colloidal supporting agents. When surfactants are used it is preferred that these be anionic in nature in order to enhance compatibility with the resin system. Usually employed in amounts of between 0.1% to .3% based on the vinyl acetate, anionic surfactants which have proved particularly successful include the dioctyl ester of sodium sulfosuccinic acid (e.g. Aerosol OT), sodium lauryl sulfate (e.g. Duponol WAQ), and the sodium salts of various alkyl aryl polyether sulfonates (such as Triton X–200).

While vinyl acetate homopolymers are preferred, the maintenance of substantially the same properties in the adhesives of this invention may be achieved by the use of copolymers of vinyl acetate with up to about 20 weight percent of a coreactive non-ionic monomer such as vinyl propionate, vinyl formate, ethyl acrylate, 2-ethylhexyl acrylate, butyl acrylate, or mixtures thereof. It is also advantageous to polymerize with up to about 5% by weight of a carboxylated coreactive monomer such as acrylic acid, methacrylic acid, itaconic acid, maleic acid, methacrylic acid dimer, and mixtures thereof. Terpolymers of vinyl aetate and said non-ionic and carboxylated coreactive monomers are also suitable.

The mixtures of the resorcinol-based resin and the vinyl acetate polymer may be made by the user at the time of applying the adhesive, just prior to the addition of the hardening agent. Alternatively, the mixture can be effected at the place of manufacture, for it has surprisingly been found that mixtures can be made which are stable to storage for many months and which may therefore be shipped in a ready-to-use form.

Various fillers and miscellaneous materials that are commonly used in wood adhesives may be and suitably are incorporated in the adhesives of this invention in their usual proportions. Examples of fillers that illustrate such use are walnut or other nut shell flour, ground Douglas fir bark, wood flour, fine asbestos, or powdered clay. Fillers may be introduced into the adhesive formulation directly or first admixed with the hardener, or both. When paraformaldehyde or alpha-polyoxymethylene are used as the hardener, admixture in dry form with a small quantity of a finely divided filler such as wood-flour, facilitates the dispersion of the hardener into the resin-vinyl acetate adhesive solution.

As to proportions, not more than about 10% by weight of vinyl acetate polymer solids, based on the weight of resorcinol-based resin solids, should be used since the desired characteristics of certain of the resorcinol-based resin adhesives may be adversely affected. The lower limit used is about 1%, with lower levels effective, but not resulting in the cost savings desired. The surprising feature of this invention is that with the addition of the vinyl acetate polymer the adhesive can be used at solids levels (resorcinol-based resin solids plus vinyl acetate polymer solids) less than required using adhesives containing only resorcinol-based resin solids. Illustrated in Example 2, hereinafter is the fact that an adhesive of the instant invention gives the same adhesive properties as a resorcinol-based resin adhesive of the prior art at the same glue spread even though the solids content thereof is 85.4% of that of the prior art adhesive. Broadly, adhesives of the present invention can be used at solids levels as low as 75% of that ordinarily used in the existing resorcinol-based resin adhesives.

The adhesive of this invention may be applied in any of the ways practiced in the application of resorcinol-based adhesives including brushing, spreading with glue spreader, spraying or using a glue gun. In each of these methods, the amount of applied adhesive is controlled by making adjustments which depend on changes that may occur in the viscosity of the adhesive during storage or changes which may occur in the blend with hardener during its "pot life." The preferred resorcinol-based resins used in preparing the adhesives of this invention have the advantage of possessing relatively the same viscosity regardless of whether the blend with hardener is made directly after manufacture of the resin or months later. Also, the blends with hardener do not change rapidly during the time of pot life. Formulations which have such relatively constant viscosity behavior are said to have "flat viscosity characteristics." The adhesives of this invention have the unexpected advantage that their viscosity behavior is very similar to that of the parent resorcinol-based adhesives and thus also have the desirable flat viscosity characteristics.

Curing of the adhesives of this invention may be carried out under conditions similar to those used in the case of the prior-art resorcinol-based resin adhesives, including curing at ambient temperature.

A factor of particular significance in processing is the open assembly time by which is meant the time between the application of the adhesive to the substrate and the assembly of the treated surfaces. It is an advantage to have the open assembly time relatively long so that the required operations may be carried out without the adhesive being prematurely hardened or redistributed in a manner so that the adhesive bond would be defective. The adhesives of the instant invention have the advantage that they permit assembly times up to thirty minutes or longer in the "open" state at ambient temperature.

The invention will be more clearly illustrated in the following examples of the practice of it wherein the properties of the cellulosic products have been tested in accordance with the applicable government and idnustry procedures.

Example 1

A still with reflux condenser and stirrer was charged with 1645 parts by weight of an 87% aqueous solution of phenol, 1250 parts of a 37% aqueous solution of formaldehyde containing 0.7% methanol, 80 parts 50% aqueous causic soda solution and 310 parts of water. The mixture was heated to 90° C., held at that temperature for 30 minutes and then cooled. Next 1200 parts of resorcinol were added and the mixture was reheated and maintained at reflux for several hours until a Gardner viscosity of V was reached. The product was then recooled and there was added a mixture of 200 parts water with 300 parts of a denatured alcohol of the composition 94% by weight 95% ethanol, 5.3% ethyl acetate and .85% aviation gasoline. The resulting resorcinol-based resin solution had solids content of 54.8% and a viscosity of 364 cps. at 21° C.

A solid hardener was prepared by dry-blending 50 parts of alpha-polyoxymethylene with 28 parts walnut shell flour and 22 parts Douglas fir flour.

A 79.0 part portion of the resorcinol-based resin solution was extended with 2.3 parts of a polyvinyl acetate homopolymer emulsion containing 55% solids, 14.1 parts water, 4.6 parts of a denatured alcohol (Solox), and 16 parts of above-described solid hardener. Small Douglas fir beams were glued by applying this composition at a spread of 80 lbs. per 100 sq. ft. at 70° F. Tests were made with varying times allowed between the spreading and the assembly of the beams. In one case the beams were assembled immediately after application of the glue; in other cases the assembly was carried out after 10 minutes and 60 minutes respectively after application of the glue. Each assembly was clamped at a pressure of 125 p.s.i. and kept in clamped condition overnight at a temperature of 70–75° F. After removal of the clamps the assemblies were aged for several days at room temperature and then tested. In all cases shear strength averaged 310 p.s.i. and wood failure was 83%. Delamination tests (AITC–110) showed less than 1% delamination. These results were typical of those obtainable with the normal application, at the same spread of 80 lbs. per 1000 sq. ft., of the non-extended resorcinol-based parent resin and also are better than the wet-use requirements of specification CS–253–63 that shear strength should be about 1050 p.s.i. with at least 70% wood failure and that delaminations should be less than 10%.

Example 2

A sample of 55% solids polyvinyl acetate homopolymer emulsion was cut to calculated solids of 20% with a mixture of equal parts acetone and denatured alcohol, resulting in a hazy solution.

A portion of the resorcinol-based resin of Example 1 was extended by mixing 69.5 parts of said resin with 17.4 parts of this 20% polyvinyl acetate solution and 13.1 parts of denatured alcohol, corresponding to 9 parts of polyvinyl acetate per 100 parts of resorcinol-based resin solids. To this extended formulation there was added 14.0 parts of the dry-blended hardener of Example 1 and the mixture was used to glue fir beams according to the procedure of Example 1. The obtained shear strengths were 1295 p.s.i. with 90% wood failure and a delamination value of 1.4%. These values again exceed the requirements of specification CS–253–63 for wet-use.

Example 3

A vessel equipped with a mixer was charged with 83.5 parts of a resorcinol-phenol resin of commerce, Cascophen RS–240–MD, containing 53% solids, 5.2 parts of a denatured alcohol (Solox) and a dilution of 2.6 parts of a polyvinyl acetate copolymer emulsion, containing 55% solids, with 5.2 parts of water. When the mixture had become homogeneous there was further added 3.5 parts more of water. Prior to using this composition as a glue there was added a hardener of commerce based upon alpha-polyoxymethylene (FM–124–D). This adhesive composition contained about 3.2 parts of polyvinyl acetate solids per 100 parts resorcinol-based solids. This modified resin adhesive was used to glue plywood of three-eights inch thickness to the two-inch surface of a piece of 2 x 4 lumber in a hot press with platen at temperature of 430° F. The total solids applied represented an economy at current prices of over 20% in cost of adhesive materials compared to the normal use of the non-extended resorcinol-based resin of commerce. The curing cycle required to obtain a bond sufficiently strong for chiseling after removal from the hot press and cooling was 5 minutes.

Example 4

Using the procedure of Example 3, an adhesive was prepared by blending 80 parts by weight of a commercially available resorcinol-based resin, Cascophen LT–71 containing 53% solids with 3.0 parts of a polyvinyl acetate homopolymer emulsion comprising about 5% polyvinyl alcohol based on the weight of polyvinyl acetate, and 17 parts of water. Great care was taken to homogenize this blend thoroughly. An aliquot of this blended adhesive was formulated with a commercial hardener FM–282 based on alpha-polyoxymethylene in the proportions of 16 parts hardener per 100 parts by weight of the adhesive. Small beams of oak were glued with this formulation containing hardener, using lumber conditioned at 70° F. Spreads were made at 80 lbs. per 1000 sq. ft. and at three different assembly times including immediate ("closed") assembly and with open assembly times of 15 minutes and 75 minutes respectively. The assemblies were cured overnight at 70–75° F. and 125 p.s.i. After aging at room temperature for several days, dry shear strength averaged 3050 lbs. p.s.i. with no significant difference among samples corresponding to different assembly times. The weathering test showed 3.9% delamination. These results met the requirements of specification MIL–A–397B which stipulates that the dry shear strength should be at least 1800 lbs. per square inch, the wood failure greater than 75% and the delamination less than 8%.

Example 5

The formulation with hardener described in Example 4 was used to glue maple beams under the same conditions as set forth in Example 4. The dry shear strength obtained was 3180 p.s.i. as compared to 2800 required by specification MIL–A–397B. Furthermore, the tests showed 68% wood failure whereas said specifications have no wood failure requirement.

Example 6

Birch plywood was laminated using the adhesive and procedure of Example 4. Dry shear strength obtained was 410 p.s.i. as compared with the 400 p.s.i. requirement of specification MIL–A–397B. The wood failure was 47%. After a 48-hour standard water soak the shear strength was 550 p.s.i. with 98% wood failure. After a standard 3-hour boil the shear strength was 520 p.s.i. with 99% wood failure.

Example 7

Small beams of Douglas fir were glued and tested according to the procedures of Example 4, a dry shear strength equal to 1710 p.s.i. with 97% wood failure was obtained. As was the case in all previous examples the test results did not vary significantly with assembly time, up to 75 minutes.

Example 8

The modified adhesive of Example 4 made by blending Cascophen LT–71, polyvinyl acetate latex and water was found to be stable at room temperature storage for several months. Gluing tests made with the stored adhesive according to the procedures used in the preceding examples give substantially the same results as initially.

Example 9

In a manner similar to that of Example 3, a blend was made by extending 77.5 parts of resorcinol-based commercial resin Penacolite G–4422 with 4.7 parts of a 55% solids latex of a vinyl acetate copolymer comprising .2% acrylic acid based on vinyl acetate, 9.12 parts of water and 8.4 parts of Solox denatured alcohol. Small Douglas fir beams were glued with mixes incorporating 16 parts by weight of G–4400 commercial hardener per 100 parts of the blend of this example. Tests were carried out by procedures similar to those of the preceding examples using representative conditions of glue spread and temperature and time of lumber assembly. The results summarized in the accompanying table indicate that the beams were all well glued exceeding the requirements of specification CS–253–63. In every case the delamination was less than 1% in weathering test AITC–110 involving alternate cycles of vacuum and pressure. The properties throughout corresponded satisfactorily to those obtained with equivalent spreads of straight Penacolite G–4422 but amounted to a saving of at least 20% in coat of raw materials at the current price levels.

TABLE I.—ASSEMBLY

| Lbs. glue spread per 1,000 sq. ft. | Lumber temperature, degrees F. | Minutes Open | Minutes Closed | Shear strength, p.s.i. | Percent wood failure |
|---|---|---|---|---|---|
| 70 | 55 |  |  | 120 | 1,455 | 95 |
| 80 | 65 |  |  | 100 | 1,560 | 94 |
| 70 | 73 | 20 | 40 | 1,350 | 96 |
| 90 | 73 | 30 | 60 | 1,400 | 96 |

Example 10

The procedure of Example 1 is followed except that the polyvinyl acetate homopolymer emulsion is replaced separately and in turn by emulsion copolymers of vinyl acetate with respectively 5, 15, and 20 parts of respectively vinyl propionate, vinyl formate, ethyl acrylate, 2-ethylhexyl acrylate, butyl acrylate, a 1:1 mixture of vinyl propionate and ethyl acrylate and a 1:3 mixture of vinyl formate and butyl acrylate.

In all cases bond strengths are good and wood failure is high.

Example 11

The procedure of Example 2 is repeated except that the 20% polyvinyl acetate solution is made by polymerizing vinyl acetate monomer in methanol solution using 2-azobis isobutyro nitrile as initiator and, upon completion of polymerization, adjusting the solids to 20% by appropriate addition of methanol. The gluing tests result in similar dry shear strength, high percentage wood failure and low delamination.

Example 12

The procedure of Example 2 is repeated except that the 20% polyvinyl acetate solution is made dissolving in methanol the appropriate amount of a vinyl acetate suspension polymer made by polymerizing vinyl acetate in a suspension comprising .0124 part by weight of polyvinyl alcohol based on vinyl acetate in the usual manner. The glue tests again result in high dry shear strength, high percentage wood failure and low delamination.

The adhesives of this invention are described herein as particularly useful in the laminating of lumber such as structural beams and in the secondary gluing of wood. It is to be understood, however, that they are excellent bonding agents for other cellulosic material such as paper, laminated plastics, particle board, rockwool and the like.

It will be understood that it is intended to cover all changes and modifications of the examples of the invention herein chosen for the purpose of illustration which do not constitute departures from the spirit and scope of the invention.

What is claimed is:

1. A method of adhering at least two cellulosic substrates which comprises applying to the surface of at least one of said substrates an adhesive composition, bringing the substrates into contact, and curing the adhesive composition to form the substrates into a unitary assembly, the adhesive composition comprising a solution of a phenol-resorcinol-formaldehyde novolac resin containing sufficient quantity of resorcinol to confer the desired capability of curing at low temperature and forming adhesive joints resistant to boiling and to weather, and a vinyl acetate polymer containing at least 80% of vinyl acetate, said polymer being present in an amount, on a solids basis, from about 1% up to about 10% by weight, based on the resin solids.

2. The method of claim 1, wherein the total amount of adhesive solids applied is approximately 15–30 pounds per 1000 square feet of surface and wherein the curing is carried out at a temperature below about 120° F.

3. The method of claim 1, wherein the resin contains from about 25 to 75 parts by weight of phenol for each 100 parts by weight of resorcinol and phenol and from about 0.5 to about 0.9 mol of formaldehyde per mol of phenol and resorcinol, said vinyl acetate polymer is a copolymer of vinyl acetate with at least one olefinically unsaturated reactive monomer, said adhesive composition including alphapolyoxymethylene hardener and a particulate filler, said hardener and said particulate filler each being present in the proportion of from about 10 to about 40 parts by weight for each 100 parts by weight of said resin and polymer solids combined.

4. The method of claim 3, wherein the total amount of adhesive solids applied is approximately 15–30 pounds per 1000 square feet of surface and wherein the curing is carried out at a temperature below about 120° F.

5. The method of claim 4, wherein curing takes place at ambient temperature.

References Cited

UNITED STATES PATENTS

| 2,699,417 | 1/1955 | Repsher et al. | 156—335 X |
| 3,210,309 | 10/1965 | Baker et al. | 260—29.3 |
| 2,609,352 | 9/1952 | Kualnes | 156—335 UX |
| 3,041,301 | 6/1962 | Armour | 156—332 X |
| 3,471,443 | 10/1969 | Bornstein | 156—335 X |

CARL D. QUARFORTH, Primary Examiner

E. A. MILLER, Assistant Examiner

U.S. Cl. X.R.

156—335